United States Patent
Cheron et al.

(10) Patent No.: US 10,327,033 B2
(45) Date of Patent: Jun. 18, 2019

(54) METHOD OF ACQUIRING ELECTRONIC PROGRAM GUIDE INFORMATION AND CORRESPONDING APPARATUS

(71) Applicant: THOMSON LICENSING, Issy de Moullineaux (FR)

(72) Inventors: Bruno Cheron, Noyal sur Vilaine (FR); Laurent Oreal, Cesson-Sevigne (FR); Bruno Le Garian, Rennes (FR)

(73) Assignee: INTERDIGITAL CE PATENT HOLDINGS, Paris (FR)

( * ) Notice: Subject to any disclaimer, the term of this patent is extended or adjusted under 35 U.S.C. 154(b) by 0 days.

(21) Appl. No.: 14/803,077

(22) Filed: Jul. 19, 2015

(65) Prior Publication Data

US 2016/0021432 A1 Jan. 21, 2016

(30) Foreign Application Priority Data

Jul. 21, 2014 (EP) .................... 14306178

(51) Int. Cl.
| | | |
|---|---|---|
| H04N 21/84 | (2011.01) | |
| H04N 21/2362 | (2011.01) | |
| H04N 21/435 | (2011.01) | |
| H04N 21/458 | (2011.01) | |
| H04N 21/434 | (2011.01) | |

(Continued)

(52) U.S. Cl.
CPC ....... *H04N 21/4586* (2013.01); *H04N 21/235* (2013.01); *H04N 21/2362* (2013.01); *H04N 21/26283* (2013.01); *H04N 21/435* (2013.01); *H04N 21/4341* (2013.01); *H04N 21/4345* (2013.01); *H04N 21/4385* (2013.01); *H04N 21/84* (2013.01); *H04N 21/8402* (2013.01)

(58) Field of Classification Search
None
See application file for complete search history.

(56) References Cited

U.S. PATENT DOCUMENTS 7,039,656 B1 * 5/2006 Tsai .................... G06F 21/31
7,222,155 B1 * 5/2007 Gebhardt ............. H04N 7/088
709/204

(Continued)

FOREIGN PATENT DOCUMENTS

| EP | 1526735 | 4/2005 |
| EP | 1763236 | 3/2007 |

(Continued)

OTHER PUBLICATIONS

Choi etal: "Design and implementation of DVB-T receiver system for digital TV", IEEE Transactions on Consumer Electronics, vol. 50, No. 4, Nov. 2004; pp. 991-998.

(Continued)

*Primary Examiner* — Ricky Chin
(74) *Attorney, Agent, or Firm* — Tutunjian & Bitetto, P.C.

(57) ABSTRACT

Optimizing 'actual' and 'other' table type EPG information acquisition. In a broadcast stream multiplex, information is comprised in event information tables of type 'actual' that comprises event or program information about a selected service, and of type 'other' that comprises event information about other services in the multiplex. An EPG database is updated with the event information comprised in the event information tables under certain conditions only.

15 Claims, 8 Drawing Sheets

(51) Int. Cl.
  *H04N 21/4385* (2011.01)
  *H04N 21/235* (2011.01)
  *H04N 21/262* (2011.01)

(56) References Cited

U.S. PATENT DOCUMENTS

| | | | |
|---|---|---|---|
| 7,376,964 B1 | 5/2008 | Kim | |
| 7,941,820 B2 | 5/2011 | Ahn | |
| 9,351,022 B2* | 5/2016 | Fan | H04N 21/2362 |
| 2002/0161911 A1* | 10/2002 | Pinckney, III | H04N 7/17336 709/231 |
| 2004/0017831 A1 | 1/2004 | Shen et al. | |
| 2004/0143785 A1* | 7/2004 | Lee | H04N 21/235 714/781 |
| 2004/0168188 A1* | 8/2004 | Bennington | H04N 5/44543 725/41 |
| 2006/0053446 A1* | 3/2006 | Kim | H04H 20/34 725/39 |
| 2006/0064629 A1* | 3/2006 | Lee | H04L 1/0061 714/798 |
| 2006/0209709 A1* | 9/2006 | Kovacevic | H04N 21/23424 370/252 |
| 2007/0036166 A1* | 2/2007 | De Marchi | H04N 21/434 370/402 |
| 2007/0127377 A1* | 6/2007 | Brocke | H04N 21/235 370/230 |
| 2007/0133693 A1* | 6/2007 | Gan | H04N 9/8042 375/240.26 |
| 2007/0266419 A1 | 11/2007 | Kim | |
| 2007/0274691 A1* | 11/2007 | Chiba | G11B 27/11 386/243 |
| 2007/0296864 A1 | 12/2007 | Kim | |
| 2008/0184325 A1* | 7/2008 | Yang | H04N 7/163 725/132 |
| 2009/0080523 A1* | 3/2009 | McDowell | H04N 19/51 375/240.15 |
| 2010/0115551 A1* | 5/2010 | Ke | H04H 60/72 725/39 |
| 2014/0122743 A1* | 5/2014 | Di Benedetto | H04L 69/22 709/250 |

FOREIGN PATENT DOCUMENTS

| | | |
|---|---|---|
| EP | 2384011 | 11/2011 |
| GB | 2360164 | 9/2001 |
| WO | WO2002102078 | 12/2002 |

OTHER PUBLICATIONS

Search Report dated Sep. 18, 2004.

* cited by examiner

Fig. 8

METHOD OF ACQUIRING ELECTRONIC PROGRAM GUIDE INFORMATION AND CORRESPONDING APPARATUS

This application claims the benefit, under 35 U.S.C. § 119 of European Patent Application No. 14306178.6, filed Jul. 21, 2014.

1. TECHNICAL FIELD

The present disclosure relates to acquisition of signaling information and in particular the acquisition of 'actual' and 'other' tables comprising Electronic Program Guide (EPG) information, such as comprised in satellite, cable or terrestrial broadcast streams.

2. TECHNICAL BACKGROUND

Set Top Box (STB) or Digital Television (DTV) devices for cable, satellite or terrestrial broadcast stream reception receive so-called Transport Streams (TS) in a multiplexed form. A transport stream multiplex comprises audio and video data packets for several channels, service discovery information for receiver installation and EPG information. The service discovery and EPG information are comprised in Service Information (SI) and Program Specific Information (PSI) tables. For receivers such as the previously mentioned STB and DTV devices, these tables are to be acquired and need to be continuously monitored for EPG information acquisition and service and installation information updates. According to widely used standards for broadcast stream transmission such as DVB (Digital Video Broadcasting), ATSC (Advanced Television Standards Committee) and ARIB (Association of Radio Industry and Business), each multiplex of services for several channels is transmitted on a separate frequency. The following is explained using DVB terminology but equivalent structures exist in other standards for transmission of service and program information in audio/video services. Each multiplex comprises SI/PSI information, comprising Event Information Tables (EIT); an 'event' being a (broadcast) program. An EIT comprises notably textual descriptions of broadcast programs. The information comprised in these EITs is stored in a database for use by the EPG. A table EIT 'P' for 'Present' carries information related to a currently broadcasted program, and a table EIT 'F' for 'Following' carries information related to a following program that will be broadcasted after the currently broadcasted program. Furthermore, EIT 'Schedule' tables carry information related to a currently broadcasted program and related to programs broadcasted after the currently broadcasted program, until up to several days or even several weeks. The EIT comprises two types, a first and a second type. An EIT 'actual' (=first type) carries event information related to an audio/video service present in a currently received transport stream. An EIT 'other' (=second type) carries event information related to audio/video services present in the 'other' transport streams. The EITs are repeatedly transmitted in transport streams in carousel form. The repeated transmission of the EITs in the carousel allows a receiver device to quickly acquire the EIT information when receiving a 'new' transport stream, e.g. upon a channel change. The frequency of repetition of the EIT information in the transport stream determines the delay with which the receiver device will be able to acquire the information comprised in the EITs for a 'new' channel when the user changes channel. The frequency of repetition of the EIT information in the transport stream is a trade-off between the mentioned delay and transmission bandwidth necessary to include the EIT information into the transport streams. Some of the disadvantages of prior-art solutions for acquisition of EPG information from these tables are best explained with the help of an example. Consider a first transport stream ('TS1') that carries EIT 'actual' P/F describing the programs comprised in that transport stream, and EIT 'other' P/F that describes programs present in other transport streams. A second transport stream ('TS2') carries EIT 'actual' P/F for its own services, and EIT 'other' P/F for services present in other transport streams. When a user changes channel from a service ('S1') in TS1 to a another service ('S2') in TS2, the EIT 'actual' P/F information related to service S1 in the EPG database is overwritten by the information related to service S1 in the EIT 'other' of service S2. When these tables comprise the same information, this means unnecessary processing for table acquisition and unnecessary database update. Additionally, in practice effects are even worse as broadcasters tend to include more complete information in the EIT 'actual' than in the EIT 'other' for reasons of bandwidth reduction. As has been mentioned previously, the EIT information is to be repeatedly transmitted with a frequency that allows acquisition of the EIT information within an acceptable delay when channel changing. Then, the above mentioned overwriting of the information in the EPG database causes information to be lost: e.g., considering the above example, when zapping from S1 of TS1 to S2 of TS2, the information related to S1, that is comprised in the EIT 'other' of TS2, will overwrite the information in the EPG database related to S1 and that was acquired from EIT 'actual' of TS1. Unfortunately, this results in a loss of information when the EIT 'actual' related to S1 on TS1 comprised more information than the EIT 'other' related to S1 on TS2.

The prior art EPG information acquisition method is thus not optimal since CPU time is lost acquiring tables that have already been acquired, and information is possibly lost when an already acquired table is replaced by another one. It would therefore be advantageous to optimize the acquisition of EPG information in order to reduce CPU time used to acquire the EPG information, to avoid unnecessary EPG database updates, and to avoid the loss of EPG information when a user changes channel.

3. SUMMARY

The present disclosure aims at alleviating some of the inconveniences of prior art.

To this end, the present disclosure discloses a method of acquiring electronic program guide information from event information tables comprised in a broadcast stream multiplex comprising audio/video data and program information for a plurality of audio/video services, the method comprising receiving an event information table from an audio/video service selected from the plurality of audio/video services comprised in the broadcast stream multiplex; the received event information table being one of a first type, comprising event information related to the selected audio/video service, or of a second type, comprising event information related to other audio/video services comprised in the broadcast stream multiplex; and if the type of the received event information table is of the first type, and its payload is different from a payload of a last received event information table that was used to update a database of electronic program guide information, updating the database with electronic program guide information comprised in the received event information table.

According to a variant embodiment of the method, it further comprises, if the type of the received event information table is of the second type, and its payload is different from payloads of previously received event information tables of the second type, and its payload is further different from a payload of a last received event information table that was used to update the database of electronic program guide information, updating of the database with the electronic program guide information comprised in the received event information table.

According to a variant embodiment of the method, a difference in payload between two event information tables is determined according to a difference between hashes computed over the payloads of the two event information tables.

According to a variant embodiment of the method, the event information tables comprise the hashes.

According to a variant embodiment of the method, the hashes are computed by a receiver implementing the method.

According to a variant embodiment of the method, the hashes are cyclic redundancy codes.

The disclosure also relates to a device configured for acquisition of electronic program guide information from event information tables comprised in a broadcast stream multiplex comprising audio/video data and program information for a plurality of audio/video services, the device comprising a demultiplexer configured to extract an event information table from an audio/video service selected from the plurality of audio/video services comprised in the broadcast stream multiplex; the extracted event information table being one of a first type, comprising event information related to the selected audio/video service, or of a second type, comprising event information related to other audio/video services comprised in the broadcast stream multiplex; and updating controller configured to update the database with electronic program guide information comprised in the extracted event information table if the type of the extracted event information table is of the first type, and its payload is different from a payload of a last extracted event information table that was used to update a database of electronic program guide information.

According to a variant embodiment of the device, the controller is further configured to update the database with the electronic program guide information comprised in the received event information table if the type of the received event information table is of the second type, and its payload is different from payloads of previously received event information tables of the second type, and its payload is further different from a payload of a last received event information table that was used to update the database of electronic program guide information.

According to a variant embodiment of the device, it further comprises storing memory configured to store hashes of payloads of extracted event information tables.

According to a variant embodiment of the device, the controller is further configured to compute the hashes.

According to a variant embodiment of the device, the controller is further configured to determine a difference in payload between two event information tables according to a difference between the hashes computed over the payloads of the two event information tables.

The present disclosure also relates to a computer program product downloadable from a communication network and/or recorded on a medium readable by computer and/or executable by a processor, comprising program code instructions for implementing the method of acquiring electronic program guide information from event information tables comprised in a broadcast stream multiplex comprising audio/video data and program information for a plurality of audio/video services.

The present disclosure also relates to a non-transitory computer-readable medium comprising a computer program product recorded thereon and capable of being run by a processor, including program code instructions for implementing the method of acquiring electronic program guide information from event information tables comprised in a broadcast stream multiplex comprising audio/video data and program information for a plurality of audio/video services.

The variant embodiments can be combined to form particular advantageous variant embodiments.

4. LIST OF FIGURES

More advantages of the present principles will appear through the description of particular, non-restricting embodiments of the disclosure.

The embodiments will be described with reference to the following figures.

5. DETAILED DESCRIPTION

Figure 1:
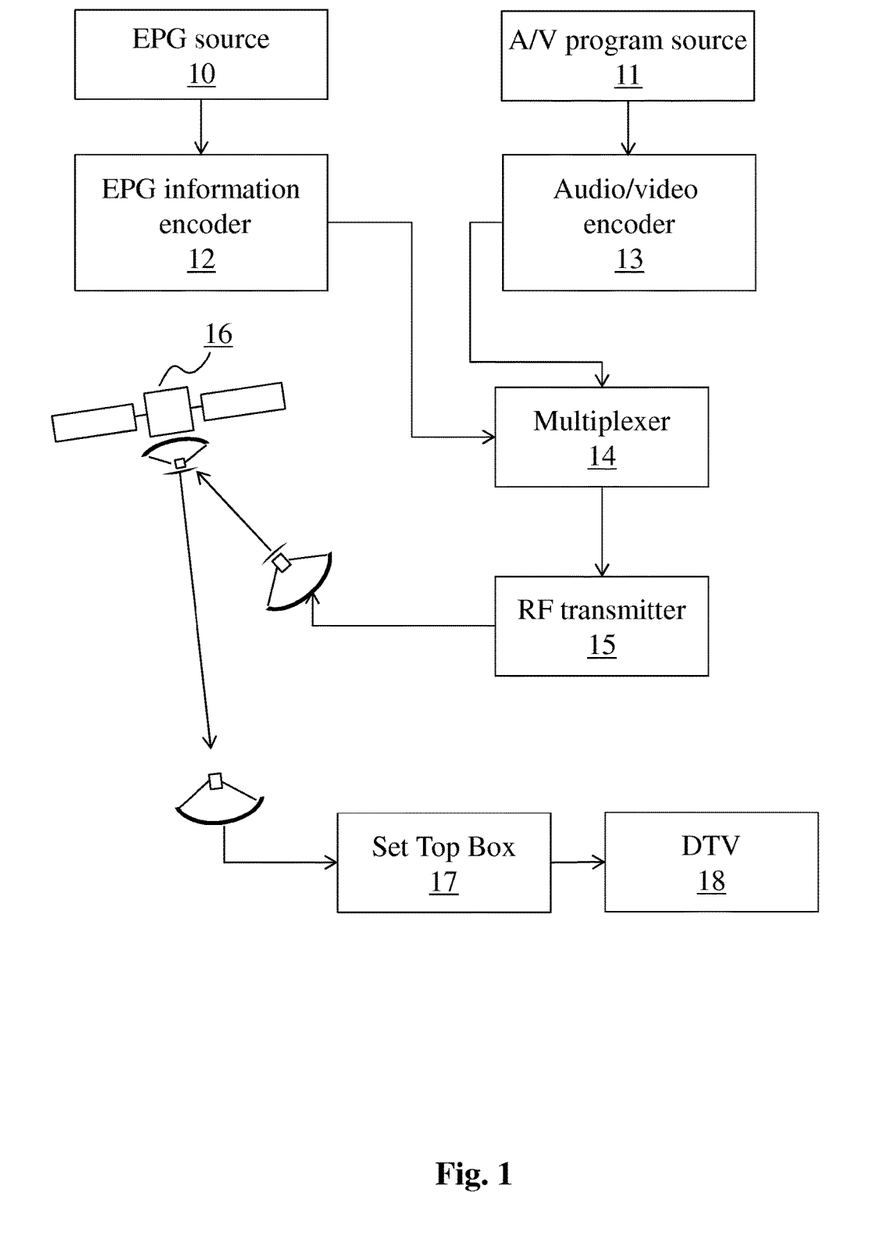
FIG. 1 is a typical system for broadcast and reception of audio/video services.

FIG. 1 is a typical system for broadcast and reception of audio/video services. EPG program information is received from an EPG source (10) or from several EPG sources (not shown). For its transmission, the EPG information is encoded, by an EPG encoder (12), in an appropriate transmission format (e.g. XML, for eXtensible Markup Language). Audio and/or video (AV) programs are received from an audio/video program source (11) or from several sources (not shown). The AV programs are encoded by an audio/video encoder (13) in an appropriate transmission format (e.g. MPEG2, H.264, etc). The encoded EPG and the encoded AV information are fed to a multiplexer (14) that multiplexes the information. Several multiplexes are thus created simultaneously, each multiplex comprising a limited number of audio/video services. The multiplexes that are output from the multiplexer are send to an RF (Radio Frequency) transmitter (15) which transmits the multiplexes to a satellite (16) using an uplink. The satellite retransmits the received multiplexes to a plurality of receivers via a downlink. On the receiver side, an STB (17) receives the multiplexes from the satellite and shows EPG data and AV programs on a display (18).

Figure 2:
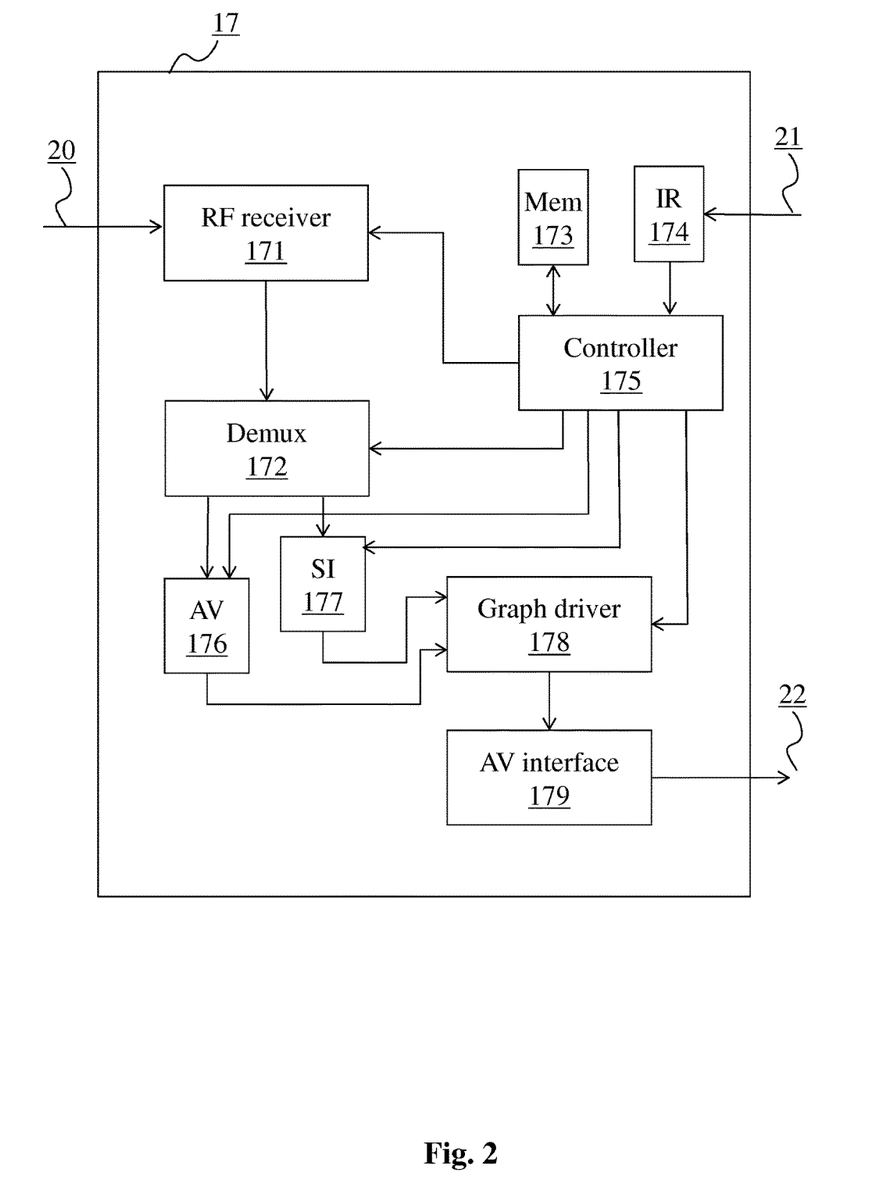
FIG. 2 is a typical receiver device such as set top box 17 of FIG. 1.

FIG. 2 is a typical receiver device such as STB (17) of FIG. 1. The receiver device receives the multiplexes as RF modulated bit streams from satellite (16) on an RF input (20). The receiver device further receives user commands for controlling the receiver device from a remote control (RC, not shown) on a dedicated input (21). The receiver device processes the received bit streams to retrieve audio/video and EPG information and outputs audio/video and EPG information on an AV output (22). The receiver device is controlled by a controller (175) e.g., a CPU or Central Processing Unit, and comprises a memory (173), e.g. volatile and non-volatile memory, for storing of data, such as computer program instructions for operating the receiver device and tables and information related to service information and EPG. Upon an RC command from a user, received via an IR receiver (174), the controller instructs the RF receiver (171) to tune to a particular radio frequency. The RF receiver receives a bit stream and transfers the received bit stream to a demultiplexer (172) or 'demux'. The controller instructs the demux to filter out audio/video information for a user-desired channel, which is handled in AV information handling block (176). The controller also instructs the demux to filter out SI information from the bit stream, which is transmitted to an SI handling block (177). The EPG information extracted from the SI information and is stored in a database (not shown), e.g. implemented in the memory. The audio/video information and the EPG information that is output by the respective handling blocks is input to a graphical driver (178). The output of the graphical driver is transmitted to audio video interface (179) and output on the AV output.

Figure 3A:
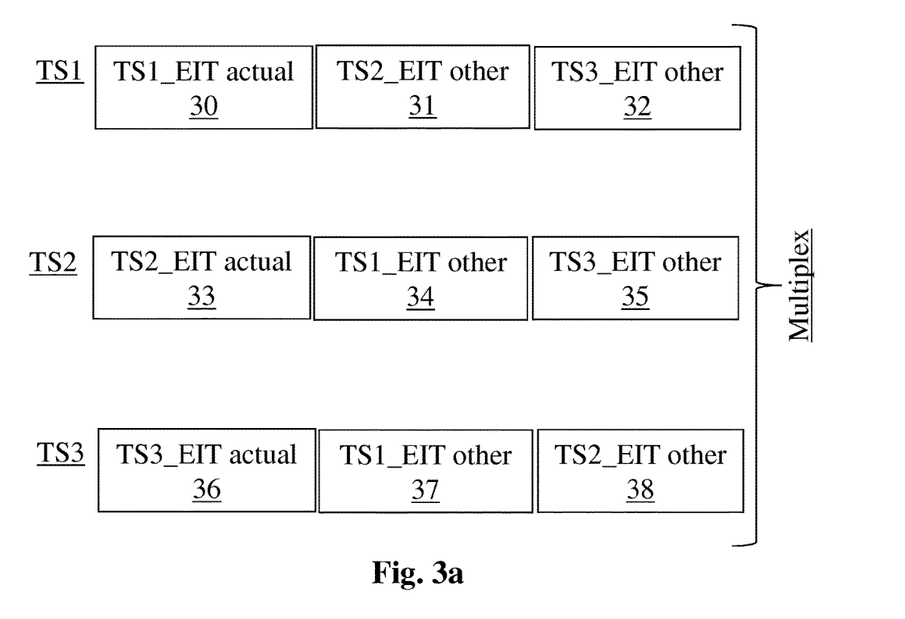
FIG. 3a is a typical example of transmission of EITs in a broadcast network.

FIG. 3a is an example of transmission of EITs in a broadcast network comprising three multiplexed Transport Streams (TS) "TS1", "TS2" and "TS3", each TS comprising EIT tables EIT 'actual' and EIT 'other', which are cyclically transmitted in a carousel. The EIT 'actual' comprises event information for the AV service present in the TS that carries the service. The EIT 'other' comprises event information for the AV services carried in the 'other' TS. The information comprised in the EITs is used for EPG and is thus stored in a database which is used by the EPG; the EIT comprises notably textual descriptions of the programs broadcasted. So, a first TS ('TS1') comprises EIT 'actual' (30) describing the service that it carries (TS packets transporting AV not shown), and EITs 'other' describing the AV services carried in the other TS of the network, i.e. here TS2_EIT_other (31) and TS3_EIT_other (32). A second TS ('TS2') comprises EIT 'actual' (33) for its own AV service, and EIT 'other' (34, 35) for AV services carried in other TS ('TS1' and 'TS3'). A third TS ('TS3') comprises EIT 'actual' (36) for its own AV service, and EIT 'other' (37, 38) for AV services carried in the other TS ('TS1' and 'TS2') of the network. Thus, each TS comprises an EIT that describes the AV service that it transports, while it also comprises the EITs of the other AV services in the network.

Figure 4:
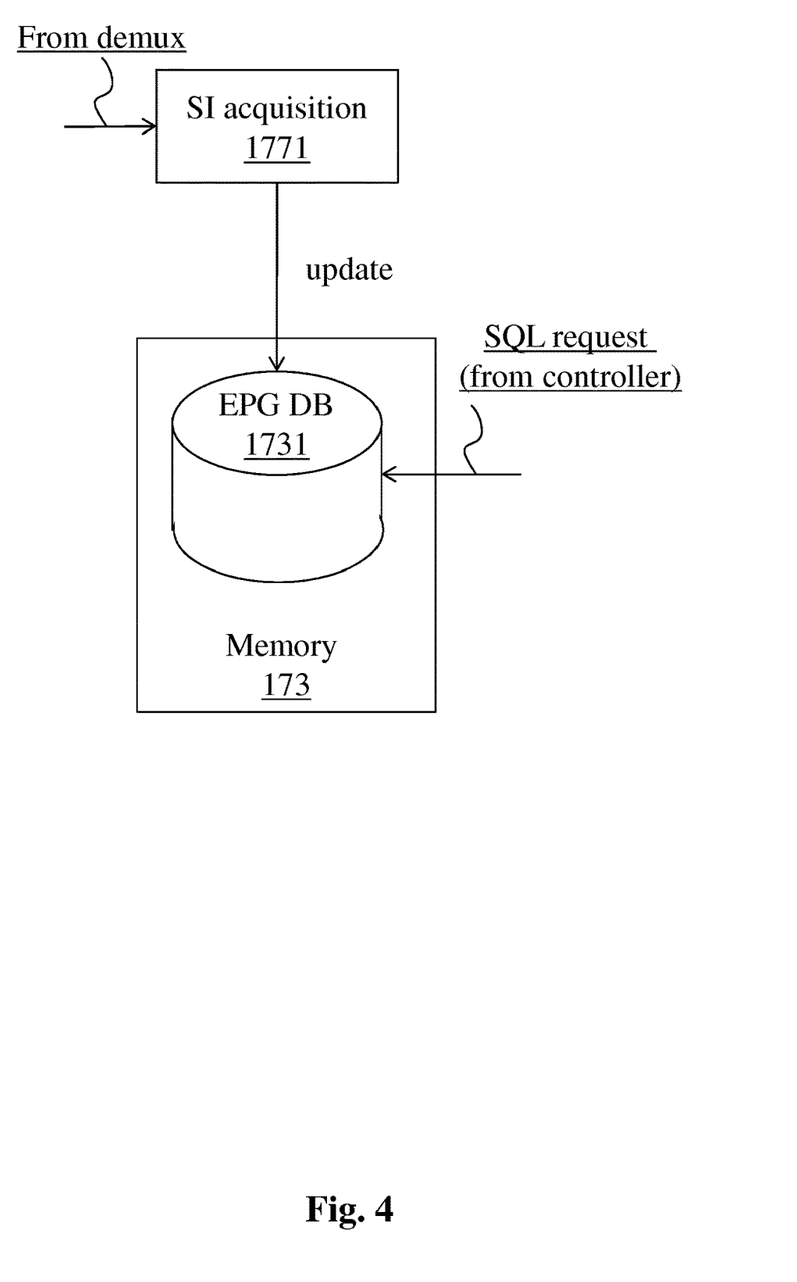
FIG. 4 is a diagram illustrating typical acquisition and storage of EPG information as for example implemented in STB 17 of FIG. 1.

FIG. 4 is a diagram illustrating typical acquisition and storage of EPG information as for example implemented in STB 17 of FIG. 1. The SI information is extracted from the information received from the demux by an SI acquisition module (1771) and is stored in an EPG database (1731), that is stored in memory (173). When EPG information is required, e.g. when the user presses on an 'INFO' button on his remote control device, the controller (175 of FIG. 2) interrogates the EPG database for EPG information, e.g. by means of an SQL request. The SI acquisition unit continuously monitors the tables that are contained in the services received, and updates the EPG database when needed. When a user tunes to an AV service 'S1' transported by transport stream 'TS1', the SI acquisition unit stores the EPG information comprised in the EIT 'actual' (30) in the database. When the user changes channel to AV service 'S2' in transported by transport stream 'TS2', the SI acquisition unit receives "new" information for the AV service 'S1', that is comprised in an EIT 'other' table (34) in 'TS2', and it updates the information related to AV service 'S1' in the EPG database. Thus, the information comprised in the database with regard to service 'S1', acquired from table 'actual' of 'TS1', is now overwritten by the information related to S1 in the EIT 'other' of 'S2'. When the 'actual' table (30) of 'TS1' comprises the same information as the 'other' table of 'TS2', this means unnecessary processing for table acquisition and unnecessary database updating. In addition, in practice, broadcasting bandwidth has a price, and a broadcaster may privilege bandwidth for good quality video and for present/following or schedule information related to the currently tuned to channel, rather than spending money on providing of full present/following or schedule information related to 'other', not currently tuned-to channels. Broadcasters tend to prefer including more complete information in the EIT 'actual' than in the EIT 'other' for reasons of bandwidth reduction. In addition, for a given service, the EITs 'other' can be different on different multiplexes. However, an EIT 'actual' for a given service and an EIT 'other' for the same service can also comprise exactly the same information.

Figure 3B:
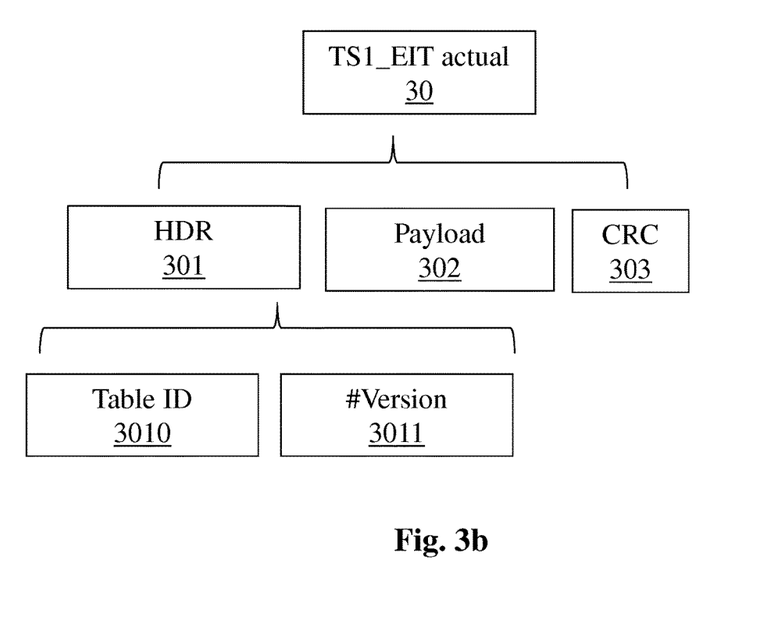
FIG. 3b is a structure of a typical EIT table.

FIG. 3b is a structure of a typical EIT table. The EIT table (30) comprises a header (301), containing a table identifier (3010) and a version number (3011); a payload (302); and a CRC (or 'hash') (CRC=Cyclic Redundancy Check) (303) computed over the entire EIT table. Between an 'actual' table and an 'other' table describing the same AV service, the table identifier changes. Thus, even when both tables comprise the same information, the CRC, that is computed over the entire table, will differ, and thus this CRC cannot be used for a quick determination if the tables comprise the same information without having to extract and compare the whole payload. As the CRC cannot be used; this means that in any case, the tables have to be processed by the SI acquiring unit. Thus, while it would be interesting after a channel change to only consider updating the EPG information in the EPG database when the EIT information related to a given service changes, there is no simple means to compare 'actual' and 'other' tables without having to extract and compare their entire payload. While it would be interesting to avoid updating the EPG database when an EIT 'other' related to a particular AV service comprises less information than an already stored EPG information in the database that was extracted from an EIT 'actual' for the same particular AV service, there is no simple means to do so without acquisition of the EIT 'other' tables and processing of the payload.

Figure 5:
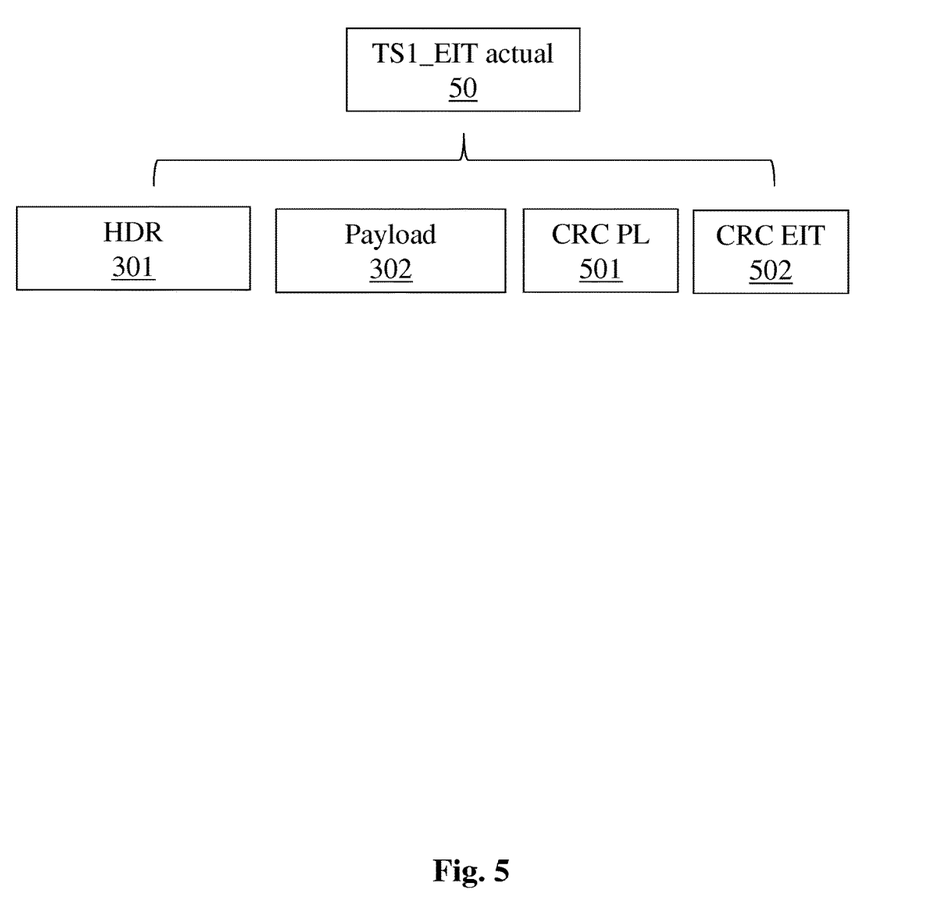
FIG. 5 is a particular structure of an EIT table according to a non-limiting embodiment of the present principles.

FIG. 5 is a particular structure of an EIT table (50) according to a non-limiting embodiment of the present principles that allows to further optimize the EPG information acquisition process. According to this embodiment, a second CRC is added (501) that is referred to as 'CRC_PL', computed only over the payload of the EIT table (Payload 302). A CRC can be referred to as being a 'hash'. In the following, the CRC that is computed over the EIT table in its entirety i.e. computed over (HDR 301+Payload 302) or computed over (HDR 301+Payload 302+CRC_PL 501) is referred to as 'CRC_EIT' (502) so as to distinguish both CRCs from each other. According to a first embodiment, a CRC_PL is added to the SI (EIT) packets. This means that the EIT signalization is modified to comprise the CRC_PL. According to an advantageous variant embodiment that avoids the need to modify the SI-EIT signalization, the CRC_PL is calculated by each of the receivers of the EIT signalization each time the receivers receives an EIT. According to a further variant embodiment, a CRC_PL is not provided in the EIT signalization nor computed, but the entire payload (302) is compared. Embedding the CRC_PL in the SI (EIT) signalization is a processing time saving optimization for the EIT signaling processing by receivers, allowing receivers to easily determine if two EIT tables have a same payload without computing CRC_PLs or comparing entire payloads. When the SI-EIT signalization comprises a CRC_PL or when the receiver computes the CRC_PL itself, the CRC_PL of each EIT is stored in memory so that it can be easily compared with CRC_PLs of other EITs. For example, when zapping from a service S1 on a transport stream TS1 to a service S2 on a transport stream TS2, the CRC_PL of the EIT 'other' for the service S1, encountered on TS2, is compared to the stored CRC_PL of the EIT 'actual' for service S1, encountered on transport stream TS1. If both CRC_PLs are equal, no further processing of the EIT 'other' table is required. This optimizes the SI acquisition in a case of a channel change where the EIT 'actual' of a service and the EIT 'other' of the same service comprise the same information. However, as has been mentioned previously, in practice the EIT 'other' comprises less information than the EIT 'actual' for a same service, in order to reduce bandwidth. In that case, the CRC_PLs of the EIT 'actual' and 'other' will be different, and the payload of the EIT 'other' should be processed again in order to find out if the EPG database should be updated with information comprised in the EIT 'other', or not. The above described solution can thus be optimized further, parting from the principle that it is observed that EIT 'other' for a service comprises less information than the EIT 'actual' for the same service. Accordingly, the EIT 'actual' takes precedence over the EIT 'other' for updating of the EPG database. In the following, the wording 'two EITs are different' means here that their payloads are different, and thus their CRC_PLs are different. The latter is applicable if CRC_PL is present in SI-EIT signalization or if CRC_PL is computed by the receiver. The wording 'two EITs are equal' means that their payloads are the same and thus their CRC_PLs are the same. The latter is applicable if CRC_PL is present in SI-EIT signalization or if CRC_PL computed by the receiver. As the EIT tables are related to a transport stream, there is a means to identify the transport stream on which an EIT is found. According to DVB for example, a transponder is identified by the tuple (on_id, ts_id). "on_id" means Original Network IDentifier and "ts_id" means Transport Stream IDentifier. From the previous, variables and update rules are defined for an efficient EPG database update algorithm according to the present principles:

Using the following variables,
- DB_CRC_PL: the CRC payload of the last EIT ('actual' or 'other') table used to update the database;
- RECVD_EIT: the received EIT. A data structure that comprises:
  - CRC_PL: the CRC of the payload of the EIT currently acquired;
  - TYPE: the type of EIT ('actual' or 'other').

the conditions for the update of the database can then be expressed as follows:

1. on reception of an EIT 'actual':
   (RECVD_EIT.CRC_PL!=DB_CRC_PL)
   wherein the sign "!=" means "not equal".
   For a particular advantageous variant embodiment, that also handles updates of the EPG database from EIT tables of type 'other', a further variable can be used:
   OTHER_CRC_PL_TUPLE: a collection of tuples ($TS_X$, $CRC\_PL_X$), the collection comprising, for each TS received the CRC_PL of the latest acquired EIT 'other'. This tuple is updated each time an EIT 'other' is acquired from a TS.
   and the conditions for the update of the database can then be extended with the following condition:
2. on reception of an EIT 'other':
   (RECVD_EIT.CRC_PL!=DB_CRC_PL) && (RECVD_EIT.CRC_PL$\notin$OTHER_CRC_PL_TUPLE)
   wherein the sign "&&" means "and", and "$\notin$" means "is not an element of".

Figure 6:
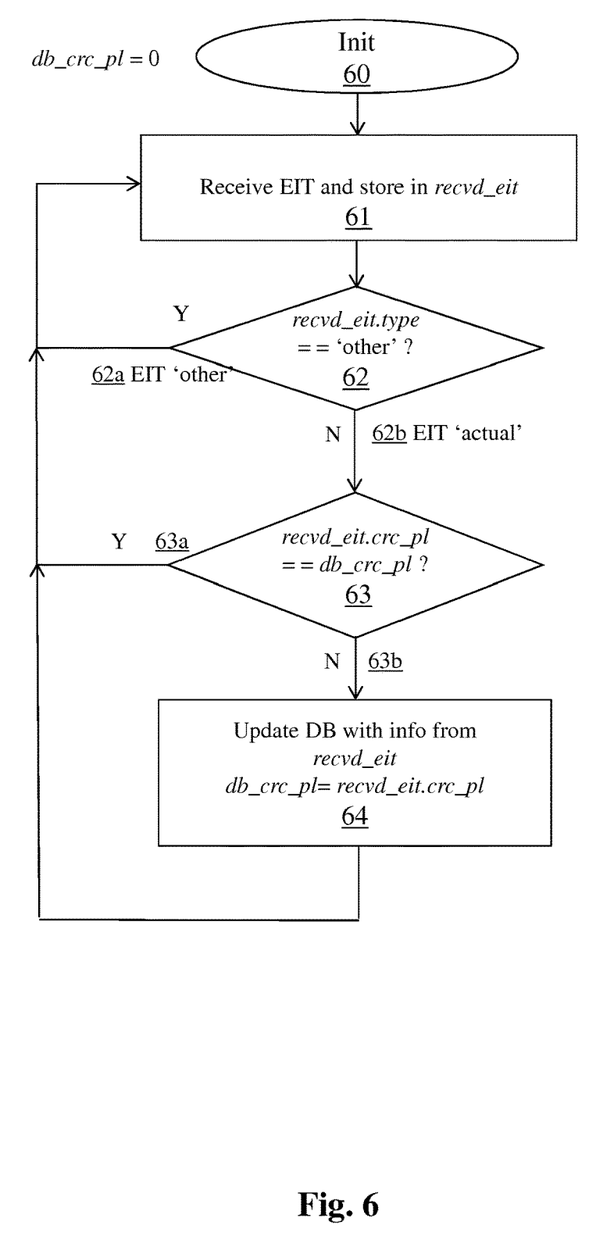
FIG. 6 illustrates a non-limiting embodiment of the present principles in a flow diagram, implemented by a receiver device.

FIG. 6 illustrates a non-limiting particular embodiment of the present principles in a flow diagram, implemented by a receiver device. The variables used are the following:
- db_crc_pl: comprises the last stored value of the CRC_PL of an EIT received;
- recvd_eit: a data structure that comprises an EIT received from a transport stream. The data structure comprises as attributes type of the EIT received, that can have the values 'other' or 'actual', and crc_pl, that is the CRC_PL of the received EIT.

In the following, the sign '==' means "is equal to", and the sign '=' in 'a=b' means that the value of b is assigned to a.

In a first initialization step 60, the variable db_crc_pl is initialized to a zero value, as there is no EIT information received yet. In a step 61, an audio/video service is selected from a broadcast stream multiplex comprising audio/video data and program information for a plurality of audio/video services. An EIT is received, which is stored in the recvd_eit data structure. In a step 62, the type of the received EIT is determined ('recvd_eit.type=='other'?'). If the type is 'other', step 62a is executed and the algorithm returns to step 61 of waiting for a next EIT. Otherwise (step 62b), the EIT type is 'actual', and step 63 is executed. In step 63 it is determined if the CRC_PL of the received EIT is equal to the CRC_PL of the last EIT used to update the database ('recvd_eit.crc_pl==db_crc_pl?'). If so (63a), the database is not updated and the algorithm returns to step 61 of waiting for a next reception of an EIT. If not so (63b), the algorithm continues with step 64 where the CRC_PL of the last EIT used to update the database is set to the CRC_PL of the received EIT 'other' ('db_crc_pl=recvd_eit.crc_pl'), the EPG database is updated with the information comprised in the received EIT, and the algorithm continues with step 61 of waiting for a next EIT.

The processing of the method is further illustrated with the help of the example usage scenario hereunder and the flow chart presented in FIG. 6. Scenario:
1: first connection to transport stream TS1 comprising a service S1.
2: first connection to transport stream TS2 comprising a service S2.
3: second connection to TS1. Between steps 1 and 3, the EIT 'actual' was updated (e.g. due to a change of program, i.e. on a given service, a program ends and another one starts).
4. second connection to TS2.
5. third connection to TS1.
6. channel changes between TS1 and TS2 without program changes.

7. Stay tuned to TS2, while a new version of EIT 'other' for S1 is received without changing the content of the EIT 'other'.

8. Stay tuned to TS2, while a new EIT 'other' for S1 is received with a different content than the previously received EIT 'other' for S1, whereby the content of the EIT 'other' is the same as that of the last received EIT 'actual' for S1 (e.g. a program change has taken place on TS1, and the EPG database has been updated accordingly in step 3, but the EIT 'other' tables for S1 on TS2 are changed only after a while).

This results in (numbers refer to the steps of the previous presented scenario):

1. On tuning to TS1, the EIT 'actual' for service S1 is acquired and the EPG information comprised in the EIT 'actual' is stored in the database (steps: 61, 62, 63, 64, 61).

2. On tuning to TS2, the EIT 'other' for service S1 is acquired but the EPG database is not updated with information comprised in the EIT 'other' (steps: 61, 62, 61).

3. On tuning back to TS1, the information comprised in the EIT 'actual' has been updated with regard to the EIT 'actual' received in step 1. The EIT 'actual' is acquired and the EPG information comprised in the EIT 'actual' is stored in the database since the contents of the EIT 'actual' have changed and is also different from that comprised in the EIT 'other' received in step 2 (steps: 61, 62, 63, 64, 61).

4. Tuning back to TS2, the EIT 'other' for S1 is acquired but the database is not updated (steps: 61, 62, 61). The database update process is thus optimized according to the present principles.

5. Tuning back to TS1, the EIT 'actual' for S1 is acquired but there is no need to update the database as the EIT 'actual' acquired is the same as the EIT 'actual' acquired in step 3 (steps: 61, 62, 63, 61). The database update process is thus optimized according to the present principles.

6. Tuning back and forth between TS2 and TS1, there is no database update as long as there are no program changes on these services. The database update process is thus optimized according to the present principles.

7. Staying tuned on TS2, a new version of EIT 'other' for S1 is received. The EPG database is not updated (steps: 61, 62, 61).

8. Staying tuned on TS2, there is a change of contents of the EIT 'other' for S1. The EPG database is not updated (steps: 61, 62, 61).

Figure 7:
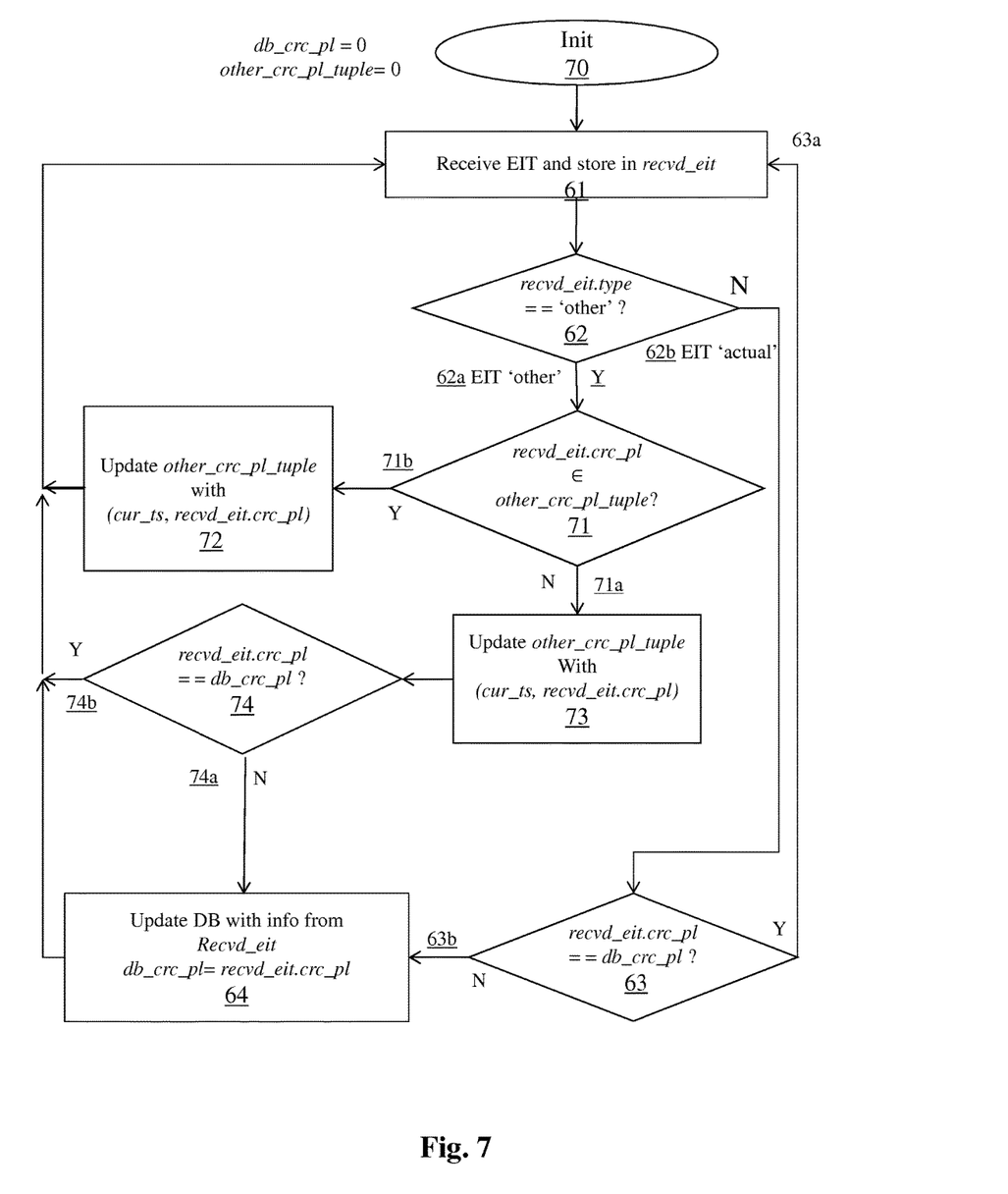
FIG. 7 illustrates a non-limiting variant embodiment of the present principles in a flow diagram, implemented by a receiver device.

FIG. 7 illustrates a non-limiting variant embodiment of the present principles in a flow diagram, implemented by a receiver device. In this variant embodiment, EIT tables of type 'other' are also allowed to update the EPG database under certain conditions. For the latter purpose, an additional variable is used:

other_crc_pl_tuple: a collection of tuples per TS, e.g. ($TS_X$,$CRC\_PL_X$). TSx is a unique identifier of a transport stream x (such as, for DVB, the tuple (on_id, ts_id)), and $CRC\_PL_X$ is the CRC of the payload of the last EIT other acquired on the $TS_X$;

In the following, the symbol '∈' means 'is an element of'.

In the following, 'cur_ts' means the currently-tuned-to transport stream. In the following, 'TSx' means the unique identifier of the currently tuned to transport stream, and 'CRC_PLx' is the CRC_PL of an EIT acquired on TSx.

In a first initialization step 70, the variables db_crc_pl and other_crc_pl_tuple are initialized to a zero value, as there is no EIT information received yet. In a step 61, a transport stream is tuned to and an EIT is received, which is stored in the recvd_eit data structure. In a step 62, the type of the received EIT is determined ('recvd_eit.type=='other'?'). If the type is 'other' (62*a*), step 71 is executed. Otherwise (62*b*), the type is 'actual', and step 63 is executed. In step 71 an EIT of type 'other' has thus been received, and it is determined if the crc_pl of the received EIT 'other' is in the collection of tuples (TSx,CRC_PLx) of CRC_PLs previously acquired from transport streams ('recvd_eit.crc_pl∈other_crc_pl_tuple'). If so (71*b*), the database is not updated and the algorithm continues with step 72. In step 72, other_crc_pl_tuple is updated by the tuple (TSx,CRC_PLx), where TSx is the unique identifier of the currently tuned to transport stream, and CRC_PLx is the CRC_PL of the EIT received on the transport stream x ('recvd_eit.crc_pl'). This means that, if a tuple (TSx, CRC_PLx) already exists, it is updated by the new crc_pl of the received EIT 'other': if it does not already exist, the tuple is created and stored; and the algorithm returns to step 61 of waiting for reception of an EIT. In step 71, if the crc_pl of the received EIT is not in the collection of tuples (TSx, CRC_PLx) of CRC_PLs previously acquired from transport streams (71*a*), the algorithm continues with step 73, where other_crc_pl_tuple is updated by the tuple (TSx, CRC_PLx), wherein TSx is the unique identifier of the currently tuned to TS, and CRC_PLx is the CRC_PL of the received EIT. If a tuple for the current TS already exists, it is updated by the new crc_pl of the received EIT 'other'; else it is created. Then, in a step 74 it is determined if the CRC_PL of the received EIT is equal to the CRC_PL of the last EIT used to update the database ('recvd_eit.crc_pl==db crc_pl?'). If so (74*b*), the database is not updated and the algorithm returns to step 61 of waiting for a next reception of an EIT. If not so (74*a*), the algorithm continues with step 64 where the CRC_PL of the last EIT used to update the database is set to the CRC_PL of the received EIT 'other' ('db_crc_pl=recvd_eit.crc_pl'), and the EPG database is updated with the information comprised in the received EIT, and the algorithm continues with step 61 of waiting for a next EIT. Now returning to step 62, when in this step it is determined that the type of the received EIT is not 'other' but 'actual' (62*b*), the algorithm continues to step 63, where it is determined if the CRC_PL of the received EIT is equal to the CRC_PL of a last EIT used to update the database ('recvd_eit.crc_pl==db_crc_pl'). If not so (63*b*), the EPG database is updated with the information comprised in the received EIT in step 64, and the algorithm returns to step 61 of waiting for a next EIT. If so (63*a*), the algorithm returns to step 61 of waiting for a next EIT without updating the database.

The processing of the method is further explained with the help of the example usage scenario that was introduced previously for illustration of the method with regard to FIG. 6. This results in (numbers refer to the steps of the previous presented scenario):

1. On tuning to TS1, the EIT 'actual' for service S1 is acquired and the EPG information comprised in the EIT 'actual' is stored in the database (steps: 61, 62, 63, 64, 61).

2. On tuning to TS2, the EIT 'other' for service S1 is acquired and the EPG database is updated with information comprised in the EIT 'other' (steps: 61, 62, 67, 73, 74, 61).

3. On tuning back to TS1, the information comprised in the EIT 'actual' has been updated with regard to the EIT 'actual' received in step 1. The EIT 'actual' is acquired and the EPG information comprised in the EIT 'actual' is stored in the database since the contents of the EIT 'actual' have changed and is also different from that comprised in the EIT 'other' received in step 2 (steps: 61, 62, 63, 64, 61).

4. Tuning back to TS2, the EIT 'other' for S1 is acquired but there is no need to update the database as the EIT 'other' acquired is the same as the EIT 'other' previously acquired in step 2 (steps: 61, 62, 71, 72, 61). The database update process is thus optimized according to the present principles.

5. Tuning back to TS1, the EIT 'actual' for S1 is acquired but there is no need to update the database as the EIT 'actual' acquired is the same as the EIT 'actual' acquired in step 3 (steps: 61, 62, 63, 61). The database update process is thus optimized according to the present principles.

6. Tuning back and forth between TS2 and TS1, there is no database update as long as there are no program changes on these services. The database update process is thus optimized according to the present principles.

7. Staying tuned on TS2, a new version of EIT 'other' for S1 is received. The EPG database is not updated as the content of the newly received EIT 'other' does not change from the previously received EIT 'other' (steps: 61, 62, 71, 72, 61). The database update process is thus optimized according to the present principles.

8. Staying tuned on TS2, there is a change of contents of the EIT 'other' for S1. The EPG database is not updated since the contents of the newly received EIT 'other' is the same as that of previously received EIT 'actual' for S1 (steps: 61, 62, 71, 72, 61). The database update process is thus optimized according to the present principles.

Figure 8:
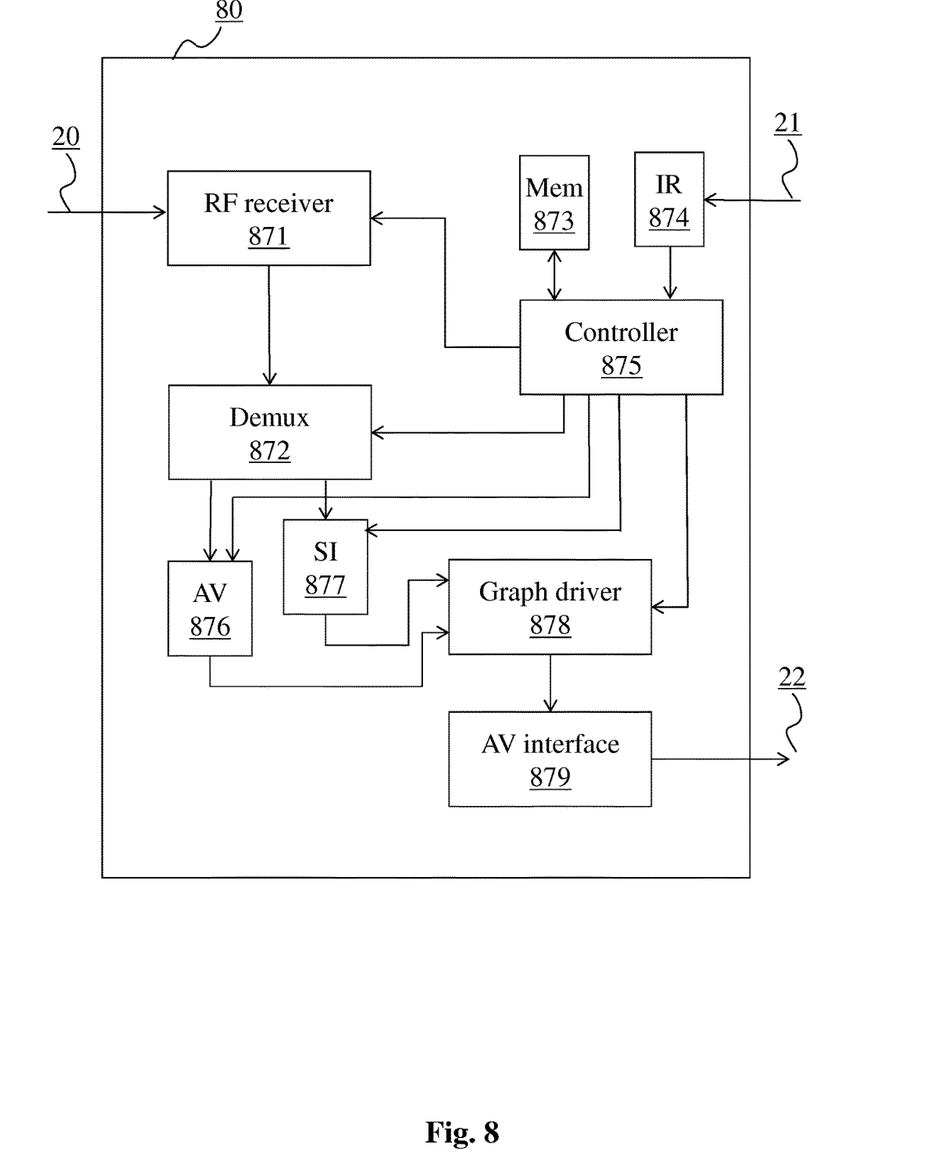
FIG. 8 illustrates a non-limiting embodiment of a receiver device suitable for implementing the present principles.

FIG. 8 illustrates a non-limiting embodiment of a receiver device (80) suitable for implementing the present principles. The receiver device receives the multiplexes as RF modulated bit streams from a satellite on its RF input (20). The receiver device further receives user commands for controlling the receiver device from a remote control (RC, not shown) on a dedicated input (21). The receiver device processes the received bit streams to retrieve audio/video and EPG information and outputs audio/video and EPG information on its AV output (22). The receiver device is controlled by a controller (875) e.g., a CPU or Central Processing Unit, and comprises a memory (873), e.g. volatile and non-volatile memory, for storing of data, such as computer program instructions for operating the receiver device and tables and information related to service information and EPG. Upon an RC command from a user, received via an IR receiver (874), the controller instructs the RF receiver (871) to tune to a particular radio frequency. The RF receiver receives a bit stream and transfers the received bit stream to a demultiplexer (872) or 'demux'. The controller instructs the demux to filter out audio/video information for a user-desired channel, which is handled in AV information handling block (876). The controller also instructs the demux to filter out SI information from the bit stream, which is transmitted to an SI handling block (877). The demultiplexer filters out or extracts event information tables from an audio/video service selected from a plurality of audio/video services comprised in a broadcast stream multiplex. The EIT information extracted is stored in a database (not shown) under certain conditions: the controller determines a type of a received event information table, the type being one of type actual, comprising event information related to the selected audio/video service, and of type other, comprising event information related to other audio/video services comprised in said broadcast stream multiplex; and the controller updates the database with electronic program guide information comprised in the extracted event information table if said type of the extracted event information table is of type actual, and its payload is different from a payload of a last extracted event information table that was used to update a database of electronic program guide information. The audio/video information and the EPG information that is output by the respective handling blocks is input to a graphical driver (878). The output of the graphical driver is transmitted to audio video interface (879) and output on the AV output. Optionally, the hashes of payloads of extracted event information tables are stored in memory (873) for quick determination if two payloads of event information tables are equal without a need to compare whole payloads.

As will be appreciated by one skilled in the art, aspects of the present principles can be embodied as a system, method or computer readable medium. Accordingly, aspects of the present principles can take the form of an entirely hardware embodiment, en entirely software embodiment (including firmware, resident software, micro-code and so forth), or an embodiment combining hardware and software aspects that can all generally be defined to herein as a "circuit", "module" or "system". Furthermore, aspects of the present principles can take the form of a computer readable storage medium. Any combination of one or more computer readable storage medium(s) can be utilized.

Thus, for example, it will be appreciated by those skilled in the art that the diagrams presented herein represent conceptual views of illustrative system components and/or circuitry embodying the principles of the present disclosure. Similarly, it will be appreciated that any flow charts, flow diagrams, state transition diagrams, pseudo code, and the like represent various processes which may be substantially represented in computer readable storage media and so executed by a computer or processor, whether or not such computer or processor is explicitly shown.

A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information there from. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The invention claimed is:

1. A method of acquiring electronic program guide information from event information tables of multiple types wherein said event information tables are comprised in a broadcast stream multiplex, said broadcast stream multiplex comprising audio/video data and program information for a plurality of audio/video services, the method comprising:
    acquiring an event information table from a selected audio/video service selected among said plurality of audio/video services comprised in said broadcast stream multiplex;
    determining whether said acquired event information table is of a first type, comprising event information related to the selected audio/video service, and determining whether said acquired event information table is of a second type, comprising event information related to other, non-selected audio/video services comprised in said broadcast stream multiplex, each of said first type and of said second type of acquired event information table comprising at least a header, a payload and a cyclic redundancy check computed over at least said header and said payload;

when said acquired event information table is of said first type, and if it is determined from comparing of payload only that its payload only is different from a payload only of a last received event information table that was used to update a database of electronic program guide information, updating the database with electronic program guide information comprised in said received event information table; and when said acquired event information table is of said second type, and if it is determined from comparing of payload only that its payload only is different from only payloads of previously received event information tables of said second type, and it is determined from comparing of payload only its payload only is further different from payload only of a last acquired event information table that was used to update said database of electronic program guide information, updating the database with the electronic program guide information comprised in said acquired event information table.

2. The method according to claim 1, wherein a difference in payload only between two event information tables is determined according to a difference between hashes computed over the payloads only of said two event information tables.

3. The method according to claim 2, wherein said event information tables comprise said hashes.

4. The method according to claim 2, wherein said hashes are computed by a receiver implementing said method.

5. The method according to claim 2, wherein said hashes are cyclic redundancy codes.

6. A device configured for acquisition of electronic program guide information from event information tables of multiple types wherein said event information tables are comprised in a broadcast stream multiplex, said broadcast multiplex comprising audio/video data and program information for a plurality of audio/video services, wherein the device comprises:

a demultiplexer configured to extract an event information table from an audio/video service selected from said plurality of audio/video services comprised in said broadcast stream multiplex;

a controller configured to determine whether said extracted event information table being one of a first type, comprising event information related to the selected audio/video service, and configured to determine whether said extracted event information table is of a second type, comprising event information related to other, non-selected audio/video services comprised in said broadcast stream multiplex, each of said first type and of said second type of event information table comprising at least a header, a payload and a cyclic redundancy check computed over at least said header and said payload;

said controller being further configured to update the database with electronic program guide information comprised in said extracted event information table when said type of said extracted event information table is of said first type, and if it is determined from comparing of payload only that its payload only is different from a payload only of a last extracted event information table that was used to update a database of electronic program guide information; and said controller being further configured to update the database with the electronic program guide information comprised in said extracted event information table when said type of said extracted event information table is of said second type, and if it is determined from comparing of payload only its payload only is different from payloads of previously received event information tables of said second type, and if it is determined from comparing of payload only that its payload only is further different from a payload only of a last received event information table that was used to update said database of electronic program guide information.

7. The device according to claim 6, further comprising a memory configured to store hashes of payloads only of extracted event information tables.

8. The device according to claim 7, wherein said controller is further configured to compute said hashes.

9. The device according to claim 8, wherein said controller is further configured to determine a difference in payload only between two event information tables according to a difference between said hashes computed over the payloads only of said two event information tables.

10. A non-transitory computer program product downloadable from a communication network or recorded on a medium readable by computer and executable by a processor, comprising program code instructions for implementing the method according to claim 1.

11. A non-transitory computer-readable medium comprising a computer program product recorded thereon and capable of being run by a processor, including program code instructions for implementing the method according to claim 1.

12. A device configured for acquisition of electronic program guide information from event information tables of multiple types wherein said event information tables are comprised in a broadcast stream multiplex, said broadcast multiplex comprising audio/video data and program information for a plurality of audio/video services, wherein the device comprises a processor configured to:

extract an event information table from an audio/video service selected from said plurality of audio/video services comprised in said broadcast stream multiplex;

determine whether said extracted event information table being one of a first type, comprising event information related to the selected audio/video service, and configured to determine whether said extracted event information table is of a second type, comprising event information related to other, non-selected audio/video services comprised in said broadcast stream multiplex, each of said first type and of said second type of event information table comprising at least a header, a payload and a cyclic redundancy check computed over at least said header and said payload;

update the database with electronic program guide information comprised in said extracted event information table when said type of said extracted event information table is of said first type, and if it is determined from comparing of payload only that its payload only is different from a payload only of a last extracted event information table that was used to update a database of electronic program guide information; and update the database with the electronic program guide information comprised in said extracted event information table when said type of said extracted event information table is of said second type, and if it is determined from comparing of payload only its payload only is different from payloads of previously received event information tables of said second type, and if it is determined from comparing of payload only that its payload only is further different from a payload only of a last received event information table that was used to update said database of electronic program guide information.

13. The device according to claim 12, further comprising a memory configured to store hashes of payloads only of extracted event information tables.

14. The device according to claim 13, wherein said processor is further configured to compute said hashes.

15. The device according to claim 12, wherein said processor is further configured to determine a difference in payload only between two event information tables according to a difference between said hashes computed over the payloads only of said two event information tables.

* * * * *